United States Patent
Chang et al.

(10) Patent No.: US 6,563,792 B1
(45) Date of Patent: May 13, 2003

(54) FUZZY LEAKY BUCKET METHOD AND APPARATUS FOR USAGE PARAMETER CONTROL IN ATM NETWORKS

(75) Inventors: Chung-Ju Chang, Hsinchu (TW); Zohn-Shiun Eul, Hsinchu (TW); Hong-Yuh Lee, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/346,909

(22) Filed: Jul. 2, 1999

(51) Int. Cl.$^7$ .............................................. H04L 12/56
(52) U.S. Cl. ................................ 370/235.1; 370/395.1
(58) Field of Search ............................. 370/230, 230.1, 370/231, 232, 233, 234, 235, 235.1, 395.1, 395.2, 395.21, 395.43

(56) References Cited

U.S. PATENT DOCUMENTS

| | | | | |
|---|---|---|---|---|
| 5,418,777 A | * | 5/1995 | Worster | 370/238 |
| 5,530,695 A | * | 6/1996 | Dighe et al. | 370/232 |
| 5,566,163 A | * | 10/1996 | Petit | 370/230 |
| 5,625,622 A | * | 4/1997 | Johri | 370/232 |
| 5,812,526 A | * | 9/1998 | Chang et al. | 370/230 |
| 6,014,384 A | * | 1/2000 | Weberhofer | 370/455 |
| 6,097,701 A | * | 8/2000 | Grunenfelder et al. | 370/235 |
| 6,122,252 A | * | 9/2000 | Aimoto et al. | 370/235 |
| 6,167,050 A | * | 12/2000 | Chung | 370/395 |
| 6,226,265 B1 | * | 5/2001 | Nakamichi et al. | 370/235 |
| 6,259,696 B1 | * | 7/2001 | Yazaki et al. | 370/395 |
| 6,353,618 B1 | * | 3/2002 | Hung et al. | 370/459 |
| 6,381,214 B1 | * | 4/2002 | Prasad | 370/230.1 |
| 6,381,649 B1 | * | 4/2002 | Carlson | 709/235 |

OTHER PUBLICATIONS

Hluchyj, M.G. et al "A Second–Order Leaky Bucket Algorithm to Guarantee QoS in ATM Networks" Global Telecommunications Conference, vol. 2, Nov. 18–22, 1996, pp. 1090–1096.*

Panno, D. et al "Performance Analysis of a Fuzzy System in the Policing of Packetized Voice Sources" Broadband Communications, Apr. 23–25, 1996, pp. 211–222.*

Chang, Chung–Ju et al "Design of a Fuzzy Usage Parameter Controller for ATM Networks" Communications, vol. 1, Jun. 8–12, 1997, pp. 215–219.*

Cheng, Ray–Guang et al "Design of a Fuzzy Traffic Controller for ATM Networks" Networking, vol. 4, Issue 3, Jun. 1996, pp. 460–469.*

Xinyu, Wu et al "The Application of Fuzzy Logic in Real Time Traffic Control in ATM Networks" Communication Technology Proceedings, vol. 1, Oct. 22–24, 1998, pp. 467–471.*

Jiang, Zhifeng et al "A Multiplexer Controlled b Fuzzy Associate Memory Leaky Bucket in ATM Networks" Circuits and Systems, vol. 1, Jun. 9–12, 1997, pp. 669–672.*

Catania, V. et al "A Comparative Analysis of Fuzzy Versus Conventional Policing Mechanisms for ATM Networks" Networking, vol. 4, Issue 3, Jun. 1996, pp. 449–459.*

Cheng, Ray–Guang et al "A QoS–Provisioning Neural Fuzzy Connection Admission Controller for Multimedia High–Speed Networks" Networking, vol. 7, Issue 1, Feb. 1999, pp. 111–121.*

Kasiolas, A. et al "A Fuzzy Based Traffic Controller for High–Speed ATM Networks Using Realistic Traffic Models" Multimedia Computing and Systems, vol. 2, Jun. 7–11, 1999, pp. 389–394.*

* cited by examiner

*Primary Examiner*—Hassan Kizou
*Assistant Examiner*—Anh-Vu H Ly

(57) ABSTRACT

To improve the performance in terms of selectivity, responsiveness, and mean queueing delay for a connetion in ATM networks, a fuzzy leaky bucket method and apparatus is introduced that monitors and controls the sustainable cell rate of the connection utilizing a fuzzy increment controller (FIC) to dynamically adjust the value of the increment for the content of the leaky bucket incorporated for policing the connection. The adjustment of the increment by the fuzzy logic is accomplished through a set of linguistic rules based upon a domain knowledge. Two system parameters of the long-term mean cell rate and the short-term mean cell rate of the connection are fed into the fuzzy increment controller to adaptively calculate an appropriate increment value with an aim to achieve a better performance.

18 Claims, 9 Drawing Sheets

X  Value of the Leaky Bucket counter
X' Auxiliary variable
LCT Last Conformance Time
T  Increment (a) MMDP (b) MMBP (a) MMDP (b) MMBP

FUZZY LEAKY BUCKET METHOD AND APPARATUS FOR USAGE PARAMETER CONTROL IN ATM NETWORKS

FIELD OF THE INVENTION

The present invention discloses, in general, a method and apparatus for traffic monitoring and controlling of a connection in packet communication networks. More specifically, the present invention provides a fuzzy leaky bucket mechanism for improving the performance in terms of selectivity, responsiveness, and mean queueing delay in ATM networks.

BACKGROUND OF THE INVENTION

The emergence of multimedia services has diversified the bandwidth requirement for data communications. The asynchronous transfer mode (ATM) is considered as a suitable technique to meet the diverse bandwidth requirement since its design objectives are to support different types of traffic and multiple quality of services (QoS). To achieve the design objectives, several traffic control mechanisms are recommended for ATM networks [1]. Two of them are the call admission control (CAC) and the usage parameter control (UPC).

CAC is performed at the call setup phase of a new call to decide whether the new call can be accepted or not. It accepts the new call if the network can afford the required bandwidth and QoS of the new connection while the QoS of the already established connections can still be maintained. Then a traffic contract is made between the new connection and the network. The traffic contract contains traffic descriptors such as the peak cell rate (PCR), the sustainable cell rate (SCR) and the maximum burst size (MBS). For CAC to perform correctly, all the established connections must not violate their respective traffic contracts, which are of vital importance to the decision making of CAC. To make sure that the established connections conform to their respective traffic contracts, CAC is coupled with another traffic control mechanism, namely, UPC.

UPC is performed at the user-network interface (UNI) during the data transfer phase. It is defined as the set of actions taken by the network to monitor and control the offered traffic of a connection so that the corresponding traffic contract is respected. Its main purpose is to protect network resources from malicious as well as unintentional misbehavior, which can affect the QoS of other already, established connections. The wide variety of services with different traffic characteristics and QoS requirements makes UPC a difficult task. The difficulty lies in finding a simple, universal and effective UPC scheme, which is able to police any types of traffic ranging from video to data traffic. Several UPC schemes such as the jumping window, triggered jumping window, moving window, exponentially weighted moving average, and leaky bucket mechanisms were studied and compared [2–5]. The most popular and well-known policing scheme is the leaky bucket algorithm because of its simplicity and effectiveness.

Monitoring and controlling the peak cell rate of a connection is not difficult because we only have to determine if the peak emission interval is smaller than the reciprocal of the negotiated peak cell rate $\Lambda_{PCR}$. But monitoring and controlling the sustainable cell rate of a connection is much more complicated because the connection is eligible to transfer cells with a short-term mean rate higher than the negotiated sustainable cell rate $\Lambda_{SCR}$ as long as the long-term mean rate of the connection conforms to $\Lambda_{SCR}$.

Usually, a traffic shaper (TS) is equipped within the customer premise equipment to regulate the cell stream of the traffic source so as to conform the negotiated SCR. The regulation is to alter the traffic characteristics of the cell stream to achieve a desired modification. The consequence of the modification is an increase in the mean cell transfer delay. The conjunction of TS and UPC, named as TS-UPC pair, should employ an identical scheme with same parameters settings so that any possible non-conforming cell that might have been detected as non-conforming by UPC will be detected ahead of time and saved in the queue by TS. In this way, the TS-UPC pair can guarantee zero cell loss ratio at UPC for a non-violating connection. Nevertheless, if a user intentionally or unintentionally changes the parameter settings in TS to enjoy a higher throughput there, UPC will detect the violation and take actions against it.

Three performance requirements have to be fulfilled by the TS-UPC pair:

(1.) High selectivity: UPC should detect the non-conforming cells of a violating connection as much as possible, while being transparent when the connection conforms to its traffic contract.

(2.) High responsiveness: the time for UPC to detect a violating connection should be rather short.

(3.) Low mean queueing delay: TS should not queue too many cells of a non-violating connection. However, the queueing delay introduced by TS on a violating connection is beyond the guarantee.

The primitive connection model with conventional TS-UPC pair is shown in FIG. 1. In a customer premise equipment 10, the component attached to the traffic source 12 is the TS 14, which contains a queue 16 and a shaper 18. The shaper 18 employs the conventional leaky bucket algorithm to determine the conformance of cells. It bypasses the conforming cells but stores the non-conforming cells in the queue for further legal transmission. The component at the entrance of the network 20 is the UPC 22 where a policer 24 is incorporated. The UPC 22 is connected to the customer premise equipment 10 through a UNI 30. The policer 24 also employs the conventional leaky bucket algorithm as the shaper 18 does. It bypasses the conforming cells but drops or tags the non-conforming cells. Despite the fact that the conventional leaky bucket algorithm is simple and effective, the conventional TS-UPC pair has performance defects such as long response time, low selectivity, and large mean queueing delay. One reason for the defects is its lack of system information such as the long-term mean cell rate of the connection, and another is its crisp structure with two fixed parameters of the threshold and the increment, which will be described later.

As specified in the ITU-T Recommendation I.371 document [1], dated May 1996, the Generic Cell Rate Algorithm (GCRA) is recommended as a conformance test for the cell stream of a connection. GCRA has two equivalent versions, the virtual scheduling algorithm and the leaky bucket algorithm. The latter seems to be better comprehended since it can be pictured as a virtual leaky bucket whose content determines the conformance of a cell. As shown in FIG. 2, the leaky bucket is viewed as a finite capacity bucket whose real-valued content drains out at one unit rate but is increased by T units for each conforming cell. If a cell arrives at the time $t_a$ when the bucket content X' is above the threshold value $\tau$, then the cell is non-conforming; otherwise, the cell is conforming and the bucket content is added by an increment T.

When the shaper 18 and the policer 24 in the TS-UPC pair shown in FIG. 1 employ the leaky bucket algorithm shown in FIG. 2 as their schemes to monitor the sustainable cell rate of a connection, the threshold value $\tau$ is taken to be $\tau_{IBT}+\tau'_{SCR}$ and the increment T is taken to be the reciprocal of the negotiated sustainable cell rate $\Lambda_{SCR}$ of the connection, where $\tau_{IBT}$ is the intrinsic burst tolerance (IBT) used to limit the burst size to the negotiated maximum burst size (MBS) and $\tau'_{SCR}$ is an additional tolerance added to account for the cell delay variation (CDV) introduced by multiplexing schemes. Details of the two parameters $\tau_{IBT}$ and $\tau'_{SCR}$ can be found in the ITU-T Recommendation I.371 [1]. The sustainable cell rate is used to enforce the mean cell rate of a connection, so it is straight forward to set $\Lambda_{SCR}=\Lambda_{mean}$ for the TS-UPC pair, where $\Lambda_{mean}$ is the mean cell rate claimed by the connection.

If $\Lambda_{SCR}$ is set to be $\Lambda_{mean}$ for the TS-UPC pair, then the possible rate fluctuations of the connection around the claimed mean cell rate will cause the leaky bucket within TS to detect some non-conforming cells. These detected non-conforming cells are stored in the queue, resulting in a long queueing delay. The undesirable long queueing delay can be avoided by making the bucket threshold $\tau$ in TS and UPC deviate from $\tau_{IBT}+\tau'_{SCR}$ to a large value. Unfortunately, a higher $\tau$ would cause the slower response time for UPC. Another solution without changing the bucket threshold is to make $\Lambda_{SCR}$ be $\Lambda_{mean}$ multiplied by a magnifying factor C, C>1. By doing this, we can eliminate the retardation provoked by a higher $\tau$. However, it has a risk of letting a connection with small rate fluctuations, e.g. a CBR connection, enjoy bandwidth higher than that negotiated. There are an infinite number of admissible couples of values for $\Lambda_{SCR}$ and $\tau$. The detailed analysis for the selection of $\Lambda_{SCR}$ and $\tau$ and the consequent system performance can be found in [6].

References [1–6] are hereby incorporated herein by reference.

In the present invention we consider a packet communication service discipline of the type with the TS-UPC pair as described in FIG. 1 and provide a mechanism incorporated a fuzzy leaky bucket scheme by which the sustainable cell rate of a connection is monitored and controlled optimally during the connection is sustained. The proposed mechanism can make a connection being policed in ATM networks achieve a better performance in terms of selectivity, responsiveness, and mean queueing delay.

SUMMARY OF THE INVENTION

The present invention describes a novel method and apparatus for implementation of a leaky bucket allowing adjustable increment for the leaky bucket content of a connection in ATM networks. In the present invention, we propose using fuzzy logic to improve the performance of the conventional leaky bucket mechanism. In one preferred embodiment, a fuzzy increment controller (FIC) is incorporated in the leaky bucket algorithm to dynamically adjust the increment for the leaky bucket content of the connection being policed. Preferably, two system parameters of the long-term mean cell rate and the short-term mean cell rate of the connection being policed are fed into the fuzzy increment controller to adaptively calculate an appropriate increment value with an aim to achieve a better performance.

The adjustment of the increment by the fuzzy logic is accomplished through a set of linguistic rules based upon a domain knowledge being as follows. When the cell stream of a connection appears to be violating the negotiated sustainable cell rate, the increment should be adjusted to be big so that the leaky bucket can quickly detect the non-conforming cells; while in contrast, when the cell stream of a connection appears to be conforming or conservative to the sustainable cell rate, the increment should be adjusted to be reasonably small so that no cell of the connection will be detected as non-conforming cells by the leaky bucket.

The leaky bucket algorithm with the fuzzy increment controller is herein called fuzzy leaky bucket algorithm, and a TS-UPC pair that employs the fuzzy leaky bucket algorithm is named as fuzzy TS-UPC pair. The fuzzy leaky bucket algorithm has the ability to quickly express the control structure of a system using a priori knowledge. Besides, it is less dependent on the availability of a precise model of the controlled process, and is more capable of handling nonlinearities. The present invention also provides simulation results to show that a fuzzy TS-UPC pair has a faster responsiveness and a higher selectivity than the conventional TS-UPC pair. In addition, the fuzzy TS-UPC pair introduces a much smaller mean queueing delay. It is also robust with respect to different traffic source models.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Figure 3:
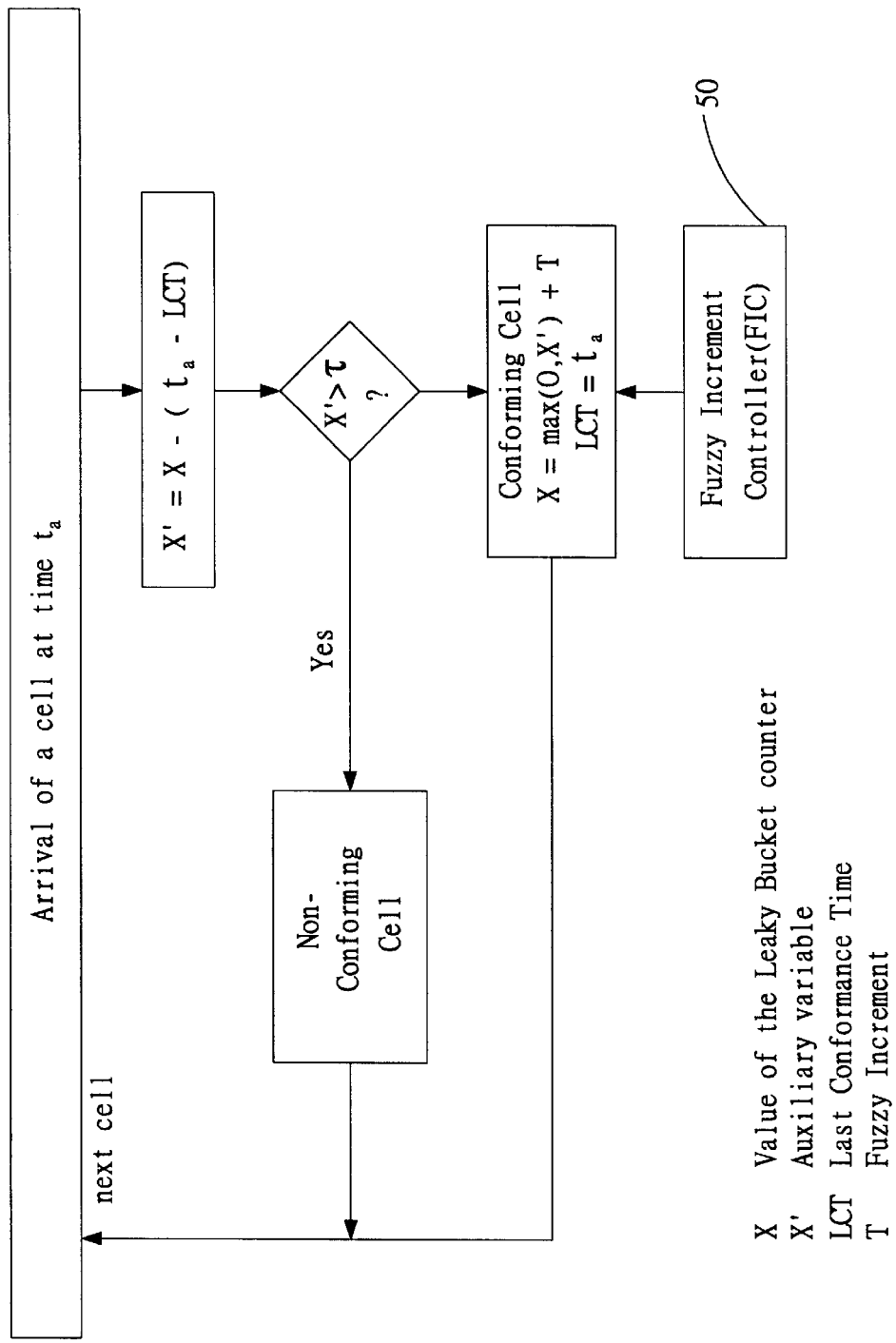
FIG. 3 shows a flow chart illustrating the operation of a fuzzy leaky bucket in accordance with the present invention

As depicted in FIG. 3, the fuzzy leaky bucket algorithm contains the conventional leaky bucket algorithm and a fuzzy increment controller (FIC) 50 to dynamically adjust the increment T, instead of using a fixed $T=1/\Lambda_{SCR}$. The fuzzy leaky bucket algorithm can be pictured as a finite capacity bucket whose content determines the conformance of the received cell. The real-valued content of the fuzzy leaky bucket drains out at a drain rate but is increased by a fuzzy increment T for each conforming cell. If a cell arrives at the time $t_a$ when the bucket content X' is above the threshold value $\tau$, then the cell is non-conforming; otherwise, the cell is conforming and the bucket content is added by an increment T.

The fuzzy increment controller 50 is designed to dynamically adjust T so that selectivity, responsiveness, and queueing delay can be optimally achieved. The reason we use the fuzzy logic system to implement the increment controller is because it can represent information in a way that resembles natural human communication, and can handle the information in a way similar to human reasoning [7]. The domain knowledge for the adjustment of T is as follows. When the cell stream of a connection appears to be violating the negotiated sustainable cell rate, T should be adjusted to be big so that the leaky bucket can quickly detect the non-conforming cells; while in contrast, when the cell stream of a connection appears to be conforming or conservative to the sustainable cell rate, T should be adjusted to be reasonably small so that no cell of the connection will be detected as non-conforming cells by the fuzzy leaky bucket (i.e., the leaky bucket would be transparent to the connection).

We choose two input variables for FIC 50, the long-term mean cell rate $\Lambda_L$ and the short-term mean cell rate $\Lambda_S$ of the connection being policed. The long-term mean cell rate is defined as the average cell rate of a connection since the beginning of the connection, and the short-term mean cell rate is defined as a moving average cell rate in a time window. $\Lambda_L$ and $\Lambda_S$ are used to provide an indication of the conformance degree of the connection. At the arrival of a cell, the statistics of $\Lambda_L$ and $\Lambda_S$ are fed into FIC 50 to obtain an optimal increment T.

Figure 4:
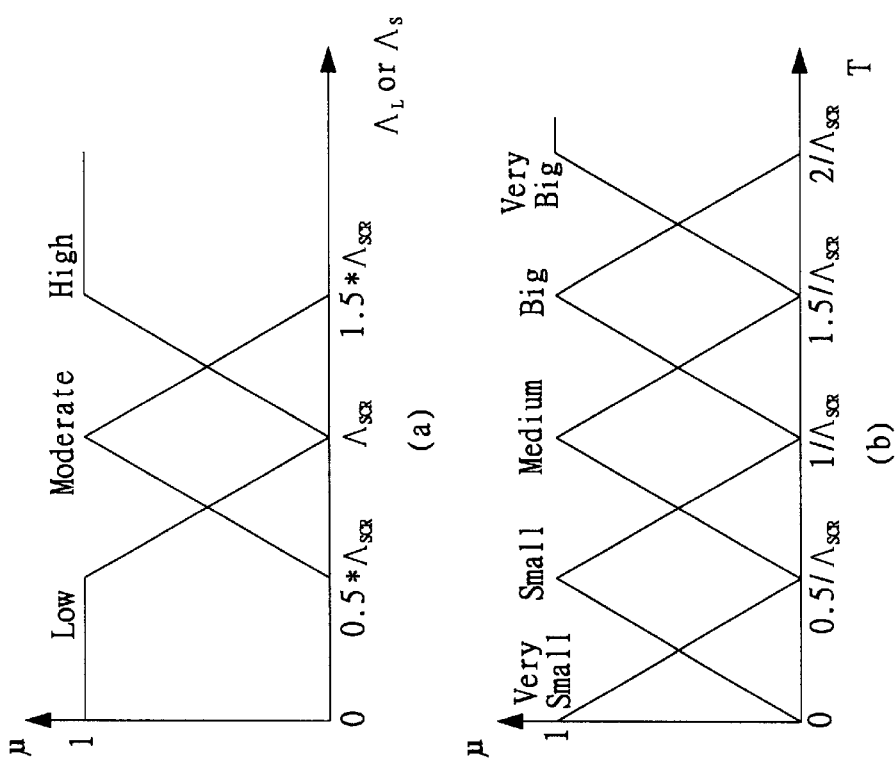
FIG. 4(a) and FIG. 4(b) show the membership functions for the input and output variables respectively of one embodiment of the present invention.

In one embodiment for illustration, we design $\Lambda_L$ and $\Lambda_S$ to have the same term sets–Low, Moderate, and High, and let T have five terms–Very Small, Small, Medium, Big, and Very Big. FIG. 4(a) and FIG. 4(b) show the membership functions for the input and output variables, respectively.

The rule base is designed according to the design knowledge on how the fuzzy increment controller 50 should behave. For example, the knowledge and experience tell us: when both $\Lambda_L$ and $\Lambda_S$ are lower than $\Lambda_{SCR}$, FIC 50 should generate a very small T so that the connection can enjoy a higher cell rate later because the connection is likely to be too conservative; when both $\Lambda_L$ and $\Lambda_S$ are higher than $\Lambda_{SCR}$, the connection is likely to violate the negotiated sustainable cell rate and FIC 50 should generate a very big increment so that the violation will be detected quickly. The inference rule is shown in Table 1.

TABLE 1

The rule base for FIC 50

| Rule | $A_L$ | $A_S$ | T |
|---|---|---|---|
| 1 | Low | Low | Very Small |
| 2 | Low | Moderate | Very Small |
| 3 | Low | High | Small |
| 4 | Moderate | Low | Small |
| 5 | Moderate | Moderate | Medium |
| 6 | Moderate | High | Big |
| 7 | High | Low | Big |
| 8 | High | Moderate | Very Big |
| 9 | High | High | Very Big |

Below is an example of how the rules should be read.

Rule 1: If ($\Lambda_L$ is low) and ($\Lambda_S$ is low), then (T is Very Small).

The fuzzy inferential engine was implemented using a discrete universe of discourse with 65536 points. The inference method adopts max-min scheme. The defuzzification method uses the center of gravity mechanism. For a more detailed study of the fuzzy logic theory, the reader is referred to [7].

Figure 5:
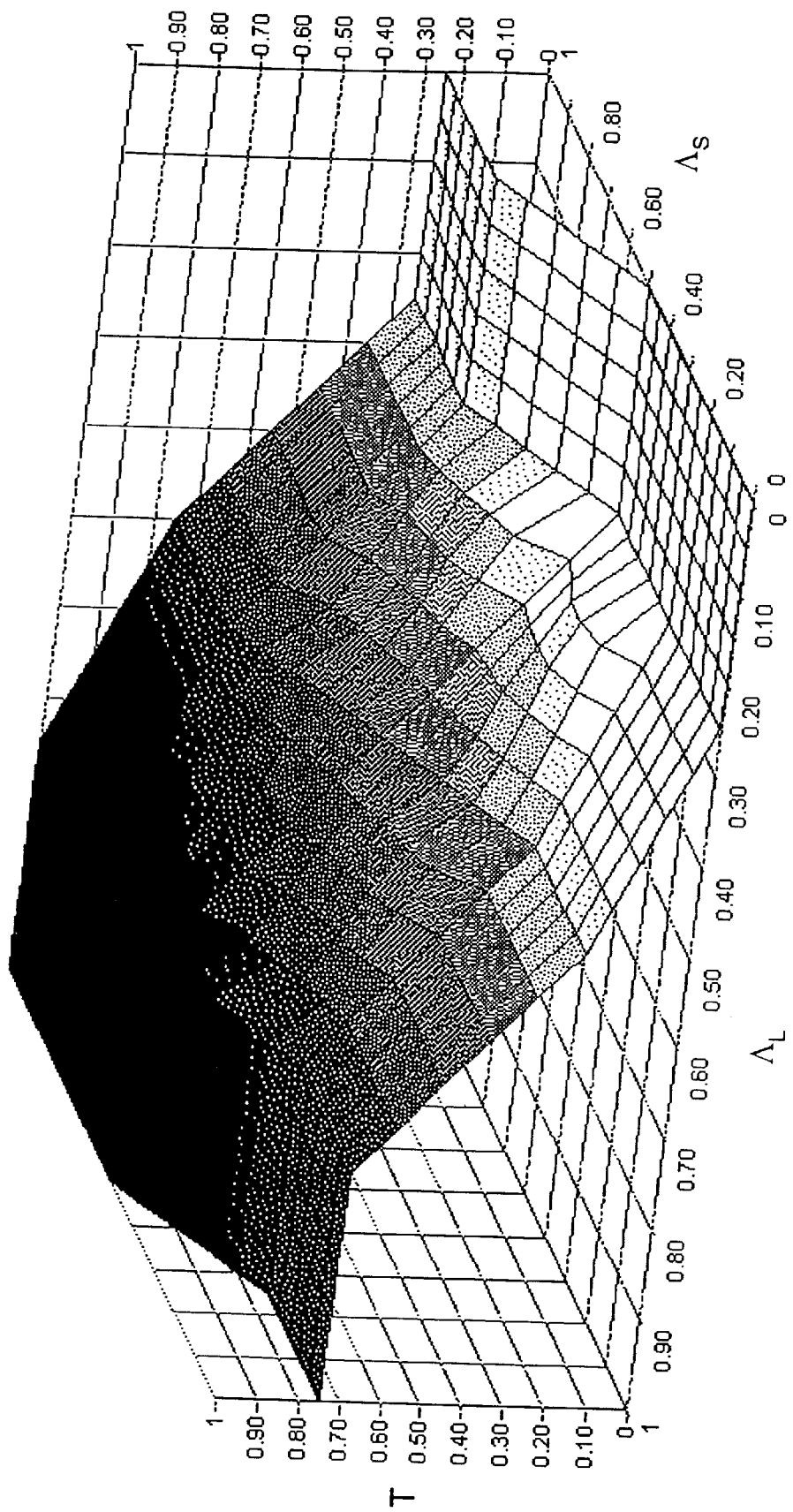
FIG. 5 shows the control surface FIC of one embodiment of the present invention.

After the FIC 50 is build, the membership functions are finely tuned by observing the progress of simulation. The tuning can be done with different objectives, such as the response time and queueing delay. Any gain in response time must be traded off by a possible increase in the queueing Delay experienced by a call. However, since the tuning of the membership functions is intuitive, it should be easy to achieve an appropriate balance between an acceptable queueing delay and a satisfactory responsiveness. The final control surface FIC is shown in FIG. 5.

The fuzzy leaky bucket algorithm is a closed-loop control system in that the values of the input variables of $\Lambda_L$ and $\Lambda_S$ for the FIC 50 are measured at the point after the policing action is done. The advantage of a closed-loop system is that the system can examine the actual traffic it passes and therefore have the ability to minimize its mis-policing probability. The fuzzy TS-UPC pair is expected to exhibit better performance, in terms of selectivity, responsiveness, and queueing delay, than the conventional TS-UPC pair.

Figure 1:
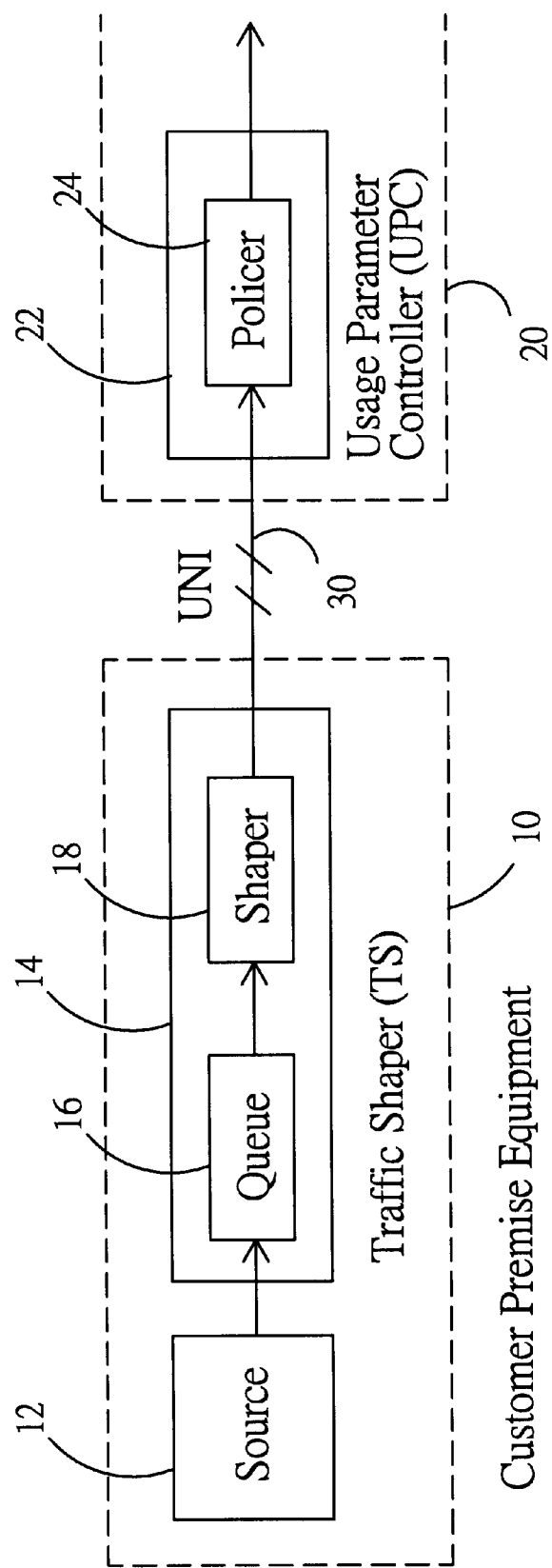
FIG. 1 shows a block diagram illustrating the primitive connection model with conventional TS-UPC pair.
Figure 2:
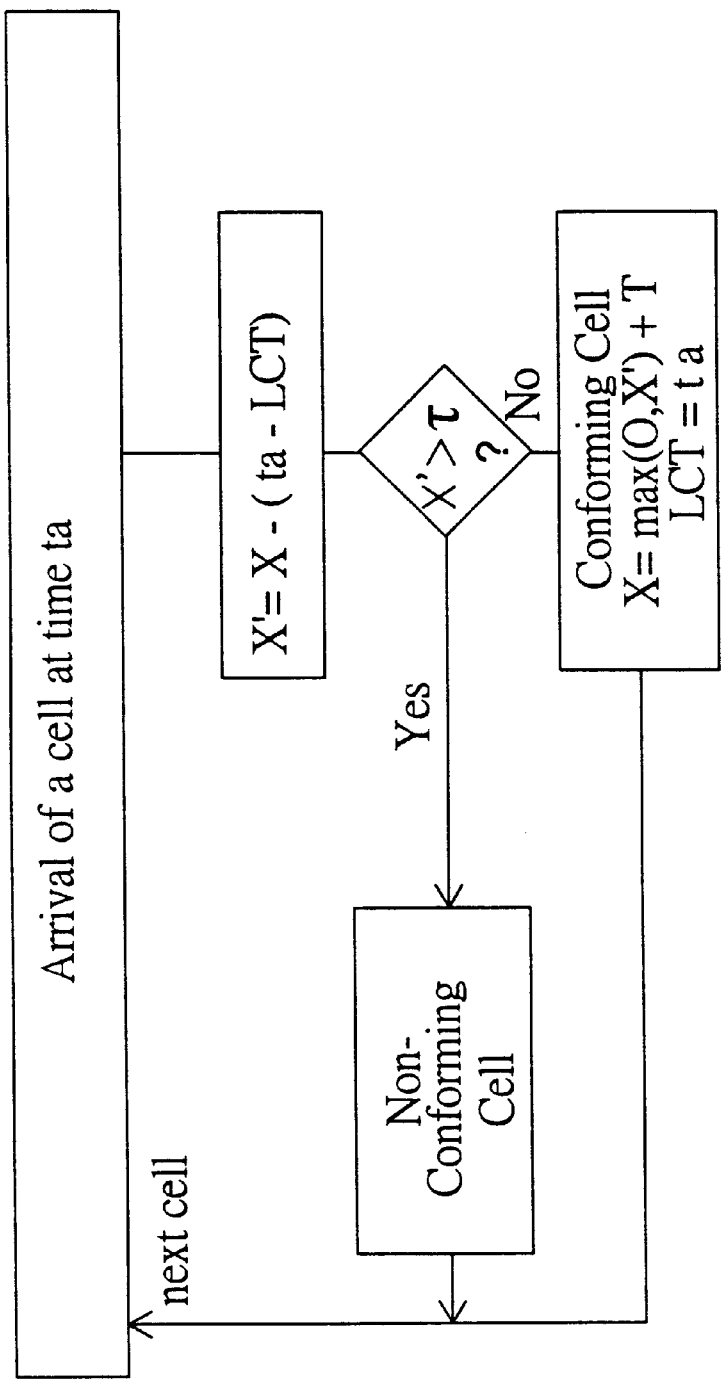
FIG. 2 shows a flow chart illustrating the operation of a standard leaky bucket.

The fuzzy TS-UPC pair is configured as that shown in FIG. 1. However, the policing mechanism employed in the fuzzy TS-UPC pair is the fuzzy leaky bucket, instead of the conventional leaky bucket. In the fuzzy TS-UPC pair, the shaper bypasses the conforming cells but stores the non-conforming cells in the queue for further legal transmission, and the policer bypasses the conforming cells but drops or tags the non-conforming cells.

To verify the robustness of the fuzzy TS-UPC pair and the conventional TS-UPC pair, simulations are performed for two types of on-off source, the 2-state MMDP and 2-state MMBP source models. The two source models can allow the mean active duration to vary so as to generate different source violation degrees. We set the ideal 2-state MMDP and 2-state MMBP sources to have mean active duration of 350 msec, the mean silence duration of 650 msec, and the mean cell rate $\Lambda_{mean}=21.875$ cells/sec. The holding time of each state of the two source models follows a geometric distribution. During the active state, the ideal 2-state MMDP source is a deterministic process which transmits cells at a fixed packetization interval of $T_{PCR}=16$ msec, whereas, the ideal 2-state MMBP source is a Bernoulli process which, for every fixed time interval $T_{PCR}=1.6$ msec, is likely to transmit a cell with probability of 0.1. The window size for calculating the short-term mean rate of both ideal source models is set to be ten times the sum of the mean active duration and mean silent duration, i.e., window size=10*(350+650) msec=10 sec.

In the simulations, C is set to be 1.1, thus $\Lambda_{SCR}=C\times\Lambda_{mean}=24.0625$ cells/sec. The increment T for the conventional leaky bucket algorithm, which is taken to be the inverse of the sustainable cell rate, equals 0.041558. The threshold $\tau_{SCR}$ of the leaky bucket equals $\tau_{IBT}+\tau'_{SCR}$, where $\tau_{IBT}=[(MBS-1)(T_{SCR}-T_{PCR})]$ and $\tau'_{SCR}=T_{SCR}$. In order to compare the performance under the MMDP and MMBP sources, $\tau_{SCR}$ for the MMBP source is set to be the same as the MMDP source. To calculate $\tau_{IBT}$ for the MMDP source, we need the maximum burst size of the source. We set the allowed MBS for the ideal MMDP source to be ten times the mean number of cell arrivals during the active state, i.e., MBS=10×(350/16)=218.75 cells. Then $\tau_{SCR}$ can be calculated as 5.607. For simplicity of simulation and not to distract our attention, the queue in TS is assumed to be of infinite capacity.

Figure 6:
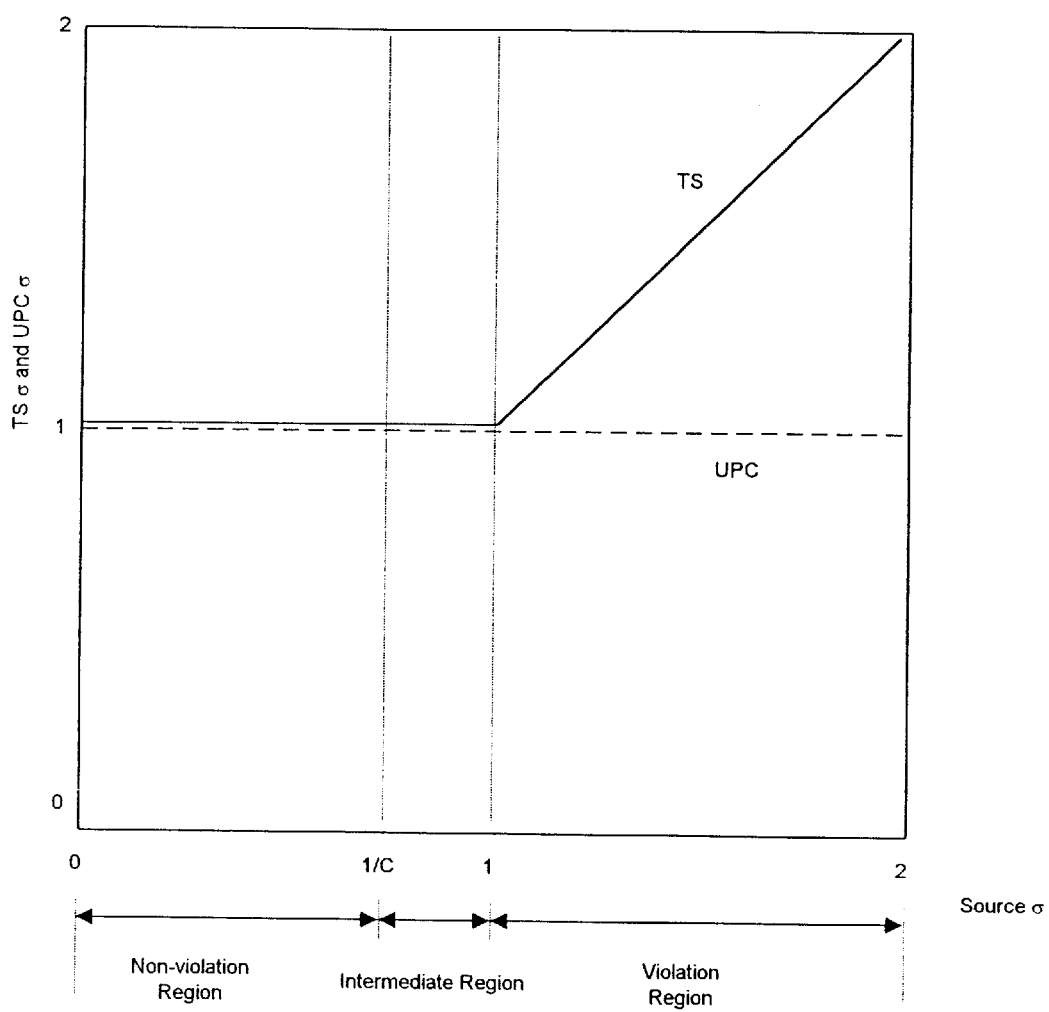
FIG. 6 shows a simulation result illustrating the correspondence between TS $\sigma$, UPC $\sigma$, and source $\sigma$ of one embodiment of the present invention.

In the present invention, we define Source σ as the ratio of the actual mean cell rate to the sustainable cell rate of the traffic source σ≧0. There are three regions for Source σ: non-violation region, intermediate region, and violation region. The non-violation region ranges from Source σ=0 to Source σ=1/C, where C is the magnifying factor. The user within this region is guaranteed a zero cell dropping (or tagging) probability imposed by UPC and a negligible queueing delay introduced by TS. The intermediate region is the region between Source σ=1/C and Source σ=1. Any user within this region can still have zero cell dropping probability, but it does not have a satisfactory queueing delay. Finally, the violation region is from beyond Source σ=1. For the user whose Source σ is located in this region, both the cell dropping probability and queueing delay are not guaranteed by the TS-UPC pair. As shown in FIG. 6, a connection with Source σ may have TS and UPC (either that of fuzzy TS-UPC pair or conventional TS-UPC pair) with the corresponding TS σ, and UPC σ, respectively, where TS σ (UPC σ) is defined as the ratio of the allowed mean cell rate to the sustainable cell rate of the TS (UPC). As can be seen from the figure, UPC σ is always held 1 for different values of Source σ's since UPC does not allow violations. For Source σ≦1, TS σ is fixed at 1 because we assume that a well-behaved user, i.e., a user with Source σ≦1, respects the parameters setting of TS within its premise. For Source σ>1, TS σ is assumed to have been changed to equal Source σ by the badly behaved user of the connection to enjoy a higher throughput at the TS. If the user had not changed TS σ, then the cell stream bypassed by the TS would have been conforming even though Source σ>1, but there would be tremendous queueing delay incurred.

Figure 7:
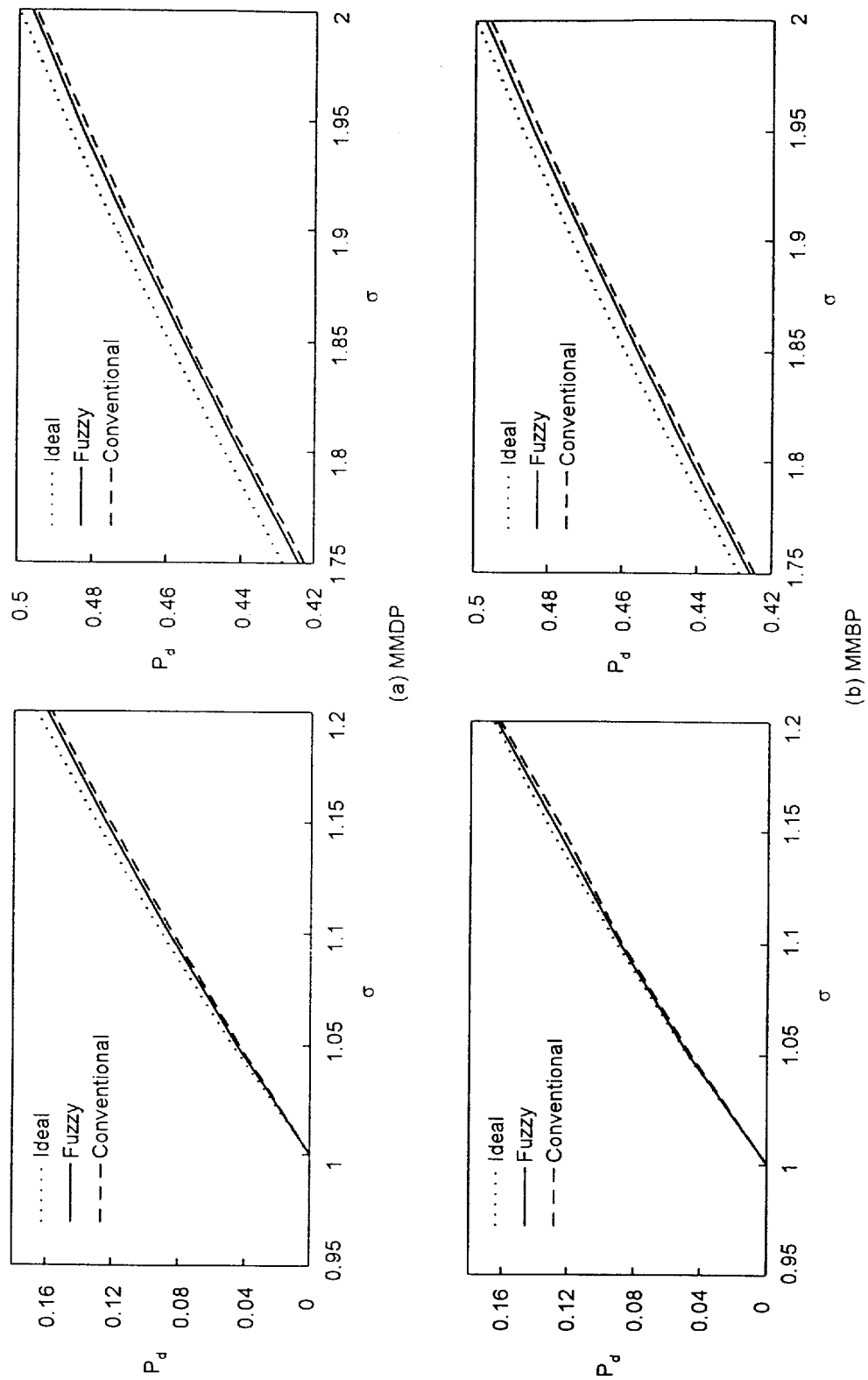
FIG. 7 shows a simulation result illustrating the selectivity of the fuzzy TS-UPC pair of one embodiment of the present invention and conventional TS-UPC pair under (a) MMDP traffic and (b) MMBP traffic.

FIG. 7 shows the selectivity curves under the 2-state MMDP source and 2-state MMBP source, respectively. The ideal curve is $P_d=1-1/\text{Source } \sigma$ for Source σ>1 and $P_d=0$ for Source σ≦1, where $P_d$ is the probability of discarding cells at UPC. As can be seen, both the conventional TS-UPC and fuzzy TS-UPC presents a zero probability of discarding cells for Source σ≦1. But for source σ>1, the fuzzy TS-UPC pair has a probability of detecting the violation closer to the ideal curve than the conventional TS-UPC pair. Although the fuzzy TS-UPC pair exhibits only a minor improvement for selectivity, it outperforms the conventional TS-UPC pair in responsiveness and queueing delay, which we next investigate.

Figure 8:
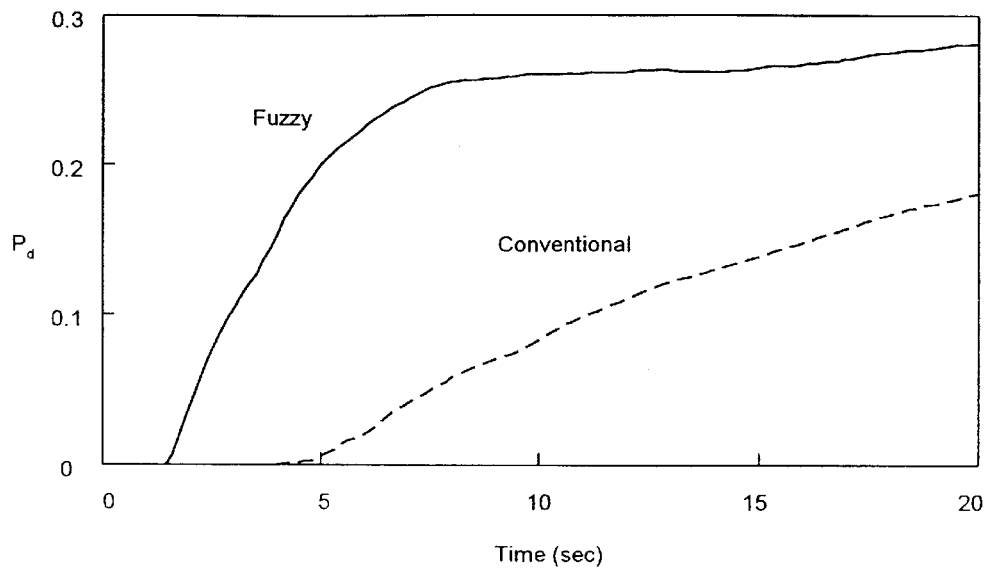
FIG. 8 shows a simulation result illustrating the responsiveness of the fuzzy TS-UPC pair of one embodiment of the present invention and conventional TS-UPC pair under (a) MMDP traffic and (b) MMBP traffic.
Figure 8:
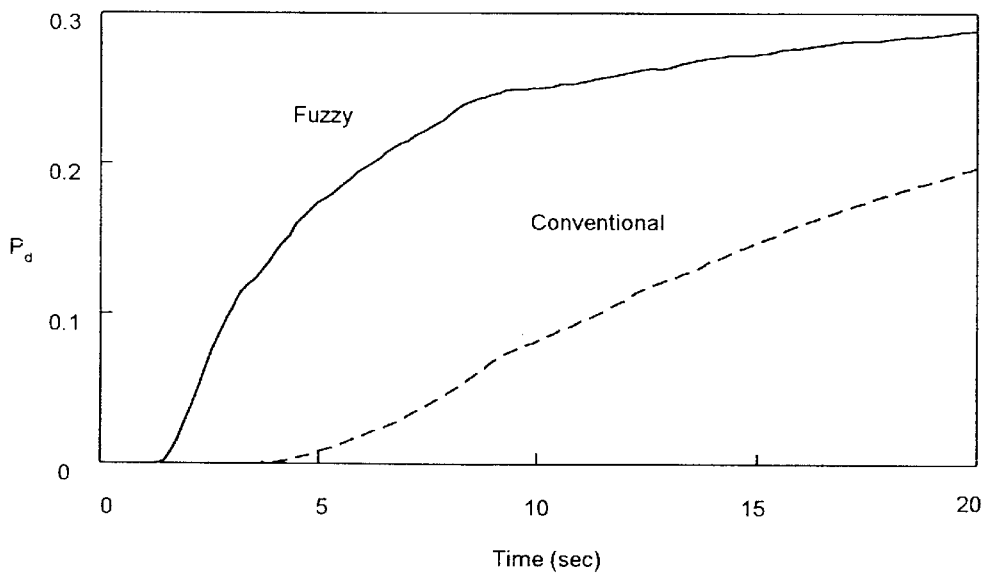

In FIG. 8(a) and FIG. 8(b), we show the responsiveness behavior of both TS-UPC pairs under the 2-state MMDP and 2-state MMBP traffic. The figures show the responsiveness in terms of the fraction of cells dropped versus the number of cells transmitted by a connection with Source σ=1.5. From the figures, we see that the fuzzy TS-UPC pair not only has a shorter response time (i.e., the time it takes to start dropping the cells of a violating connection) which is about 1.5 sec as compare to 4 sec of the conventional TS-UPC pair, but also has a higher detection rate (i.e., the rate the detection probability grows) than the conventional TS-UPC pair, under both the MMDP and MMBP traffics.

Figure 9:
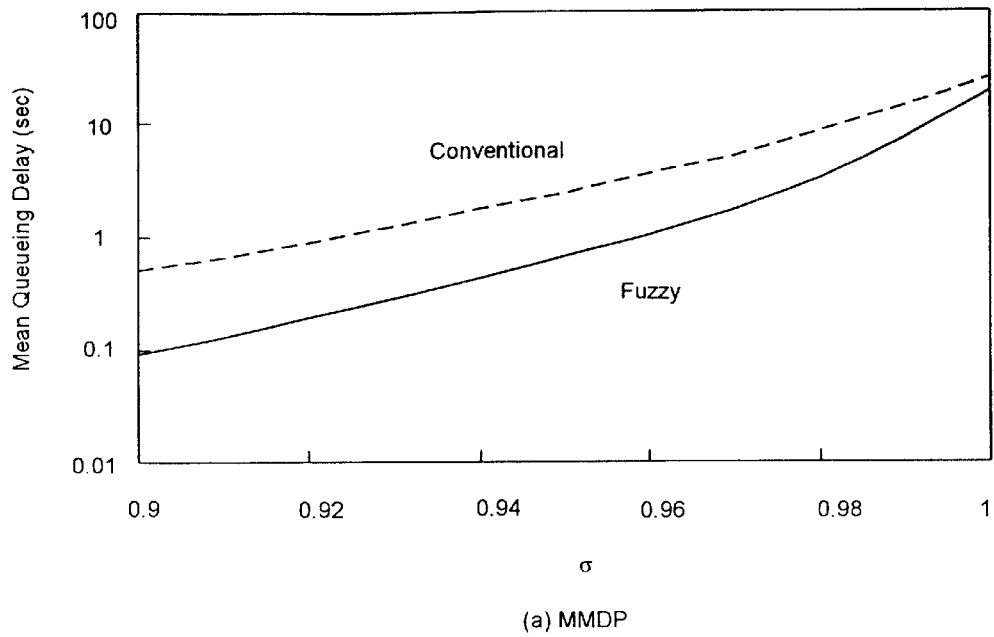
FIG. 9 shows a simulation result illustrating the mean queueing delay of the fuzzy TS-UPC pair of one embodiment of the present invention and conventional TS-UPC pair under (a) MMDP traffic and (b) MMBP traffic.
Figure 9:
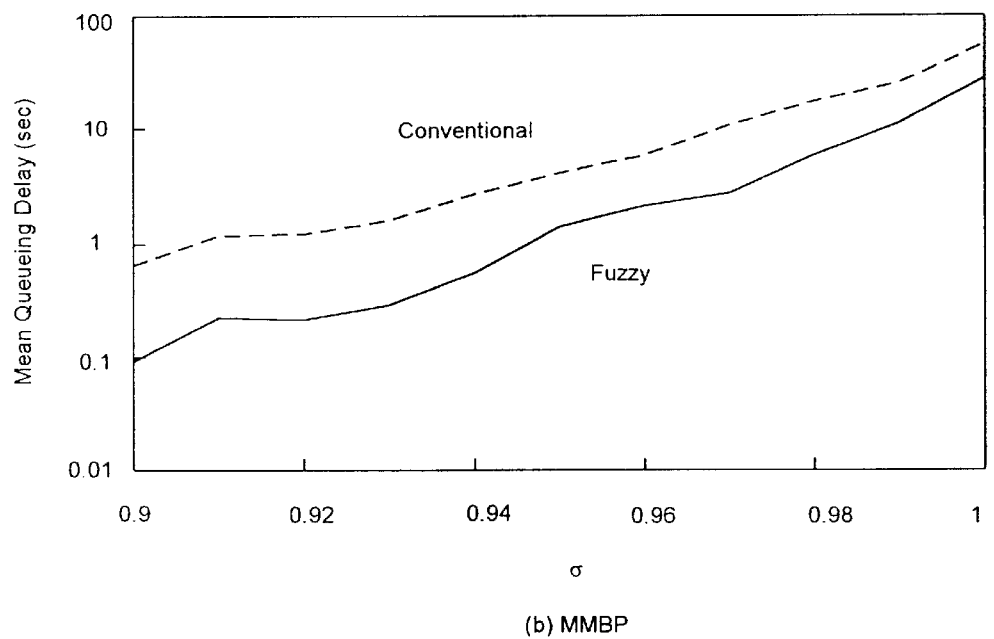

We will only consider the queueing delay of a connection with Source σ≦1 because the mean queueing delay of the violating connection needs not be guaranteed. FIG. 9 shows the mean queue length versus different Source σ's under the 2-state MMDP and 2-state MMBP traffics. A comparison of the curves reveals that the fuzzy TS-UPC pair has a more satisfactory mean queueing delay, regardless of the traffic model used. This improvement owes to the two parameters added to the fuzzy leaky bucket, namely, the long-term mean cell rate and short-term mean cell rate. With these two parameters, the fuzzy TS-UPC pair will know that the connection is conforming, so they will set the increment to be very small in order to reduce the probability of cells being stored in the queue, and thus the negotiated mean queueing delay can be guaranteed.

In the present invention we propose a fuzzy TS-UPC pair which employs the fuzzy leaky bucket algorithm to monitor and control the sustainable cell rate of a connection in ATM networks. The fuzzy leaky bucket algorithm differs from the conventional leaky bucket algorithm in that it contains a fuzzy increment controller (FIC). FIC adjusts the value of the increment by monitoring the long-term mean cell rate and the short-term mean cell rate of a connection and then by using a set of linguistic rules. The adjustment of the increment is done with the aim to achieve better performance in terms of selectivity, responsiveness, and queueing delay. We have simulated the fuzzy TS-UPC pair and the conventional TS-UPC pair under MMDP and MMBP traffic sources. Simulation results have shown that the fuzzy TS-UPC is robust against different traffic sources, without the need for changing or re-tuning the control laws or the membership functions. As is also evident from the simulation results, the fuzzy TS-UPC pair achieves a better performance, especially in responsiveness and mean queueing delay, as compared to the conventional TS-UPC pair.

From the above, it should be understood that the embodiments described, in regard to the drawings, are merely exemplary and that a person skilled in the art may make variations and modifications to the shown embodiments without departing from the spirit and scope of the present invention. All variations and modifications are intended to be included within the scope of the present invention as defined in the appended claims.

REFERENCES

[1] ITU-T, Recommendation I.371, Geneva, May 1996.
[2] E. P. Rathgeb, "Modeling and Performance Comparison of Policing Mechanism for ATM Networks," IEEE Journal on Selected Areas in Commun., vol. 9, no. 3, pp. 325–334, April 1991.
[3] L. Dittmann, S. B. Jacobsen, and K. Moth, "Flow Enforcement Algorithms for ATM Net-works," IEEE Journal on Selected Areas in Commun., vol.9, no.3, pp. 343–350, April 1991.
[4] S. Shioda and H. Saito, "Satisfying QoS standard with combined strategy for CAC and UPC," IEEE ICC'95,pp. 965–969.
[5] M. Butto', E. Cavallero, and A. Tonietti, "Effectiveness of the 'Leaky Bucket' Policing Mechanism in ATM Networks," IEEE Journal Selected Areas in Commun., vol.9, no.3, pp.335–342, April 1991.
[6] F. Guillemin, C. Rosenberg, and J. Mignault, "On Characterizing an ATM Source via the Sustainable Cell Rate Traffic Descriptor," IEEE Infocom '95, pp.1129–1136.
[7] L. A. Zadeh, "Fuzzy logic," IEEE Comput., pp. 83–93, April 1988.

What is claimed is:

1. A method for monitoring and controlling the sustainable cell rate of a connection in ATM networks using a leaky bucket mechanism, said leaky bucket mechanism including a leaky bucket whose real-valued content drains out at a drain rate but is increased by an increment for each conforming cell, said method comprising the steps of:

receiving a cell from said connection;

determining whether the received cell in the previous step is conforming in accordance with the content of said leaky bucket and a threshold; and updating said leaky bucket according to the determination of the previous step, wherein the content of said leaky bucket is added by a dynamically adjustable increment when said received cell is a conforming cell, a value of said dynamically adjustable increment being provided by fuzzy logic, said fuzzy logic monitoring a long-term mean cell rate and a short-term mean cell rate of said connection and then using a set of linguistic rules.

2. A method according to claim 1, wherein said long-term mean cell rate is determined from the average cell rate of said connection since the beginning of said connection, and said short-term mean cell rate is determined from the moving average cell rate in a time window.

3. A method according to claim 1, wherein said fuzzy logic utilizes a domain knowledge which is as follows:

when the cell stream of said connection appears to be violating the negotiated sustainable cell rate, said dynamically adjustable increment should be adjusted to be big so that the leaky bucket can quickly detect the non-conforming cells; and when the cell stream of said connection appears to be conforming or conservative to the sustainable cell rate, said dynamically adjustable increment should be adjusted to be reasonably small so that no cell of said connection will be detected as non-conforming cells by said leaky bucket.

4. A method according to claim 1, wherein said fuzzy logic utilizes a discrete universe of discourse.

5. A method according to claim 1, wherein said fuzzy logic utilizes an inference method of max-min scheme.

6. A method according to claim 1, wherein said fuzzy logic utilizes a defuzzification method of the center of gravity mechanism.

7. A method according to claim 1, wherein said fuzzy logic utilizes membership functions finely tuned by observing the progress of simulation.

8. A method for monitoring and controlling the sustainable cell rate of a connection in ATM networks using a fuzzy leaky bucket mechanism, said fuzzy leaky bucket mechanism including a leaky bucket whose real-valued content drains out at a drain rate but is increased by an increment for each conforming cell, said leaky bucket also including at least a threshold value, said method comprising the steps of:

receiving a cell from said connection;

calculating the present content of said leaky bucket;

determining whether the received cell in the first step is conforming by comparing said present content of the leaky bucket and said threshold value, if said received cell is conforming, then a fuzzy increment is provided, wherein the value of said fuzzy increment is dynamically adjusted by a fuzzy increment controller by monitoring a long-term mean cell rate and a short-term mean cell rate of said connection and then by using a set of linguistic rules; and updating said leaky bucket, wherein the content of said leaky bucket is added by said fuzzy increment when said received cell is a conforming cell.

9. A method according to claim 8, wherein said fuzzy increment controller adjusts said fuzzy increment utilizing a domain knowledge which is as follows:

when the cell stream of said connection appears to be violating the negotiated sustainable cell rate, said fuzzy increment should be adjusted to be big so that said leaky bucket can quickly detect the non-conforming cells; and when the cell stream of said connection appears to be conforming or conservative to the sustainable cell rate, said fuzzy increment should be adjusted to be reasonably small so that no cell of said connection will be detected as non-conforming cells by said fuzzy leaky bucket mechanism.

10. A method according to claim 8, wherein said long-term mean cell rate is determined from the average cell rate of said connection since the beginning of said connection, and said short-term mean cell rate is determined from the moving average cell rate in a time window.

11. A method according to claim 8, wherein said fuzzy increment controller adjusts said fuzzy increment utilizing a fuzzy inferential engine that is implemented using a discrete universe of discourse.

12. A method according to claim 8, wherein said fuzzy increment controller adjusts said fuzzy increment utilizing an inference method of max-min scheme.

13. A method according to claim 8, wherein said fuzzy increment controller adjusts said fuzzy increment utilizing a defuzzification method of the center of gravity mechanism.

14. A method according to claim 8, wherein said fuzzy increment controller adjusts said fuzzy increment utilizing membership functions finely tuned by observing the progress of simulation.

15. An apparatus for monitoring and controlling the sustainable cell rate of a connection in ATM networks using a leaky bucket algorithm, said apparatus comprising:

a leaky bucket whose real-valued content drains out at a drain rate but is increased by an adjustable increment for each conforming cell; and a fuzzy increment controller for dynamically adjusting the value of said adjustable increment by monitoring a long-term mean cell rate and a short-term mean cell rate of said connection and then by using a set of linguistic rules.

16. A fuzzy leaky bucket apparatus according to claim 15, wherein said fuzzy increment controller employs a fuzzy inferential engine being implemented using a discrete universe of discourse.

17. A fuzzy leaky bucket apparatus according to claim 15, wherein said fuzzy increment controller employs an inference method of max-min scheme.

18. A fuzzy leaky bucket apparatus according to claim 15, wherein said fuzzy increment controller employs a defuzzification method using the center of gravity mechanism.

* * * * *